(12) United States Patent
Lee (10) Patent No.: US 7,612,764 B2
(45) Date of Patent: Nov. 3, 2009

(54) POSITION TRACKING SENSOR OF OPTICAL MOUSE AND METHOD OF CONTROLLING THE SAME

(75) Inventor: Woo-Seok Lee, Yongin (KR)

(73) Assignee: ATLab Inc. (KR)

( * ) Notice: Subject to any disclaimer, the term of this patent is extended or adjusted under 35 U.S.C. 154(b) by 677 days.

(21) Appl. No.: 10/991,836

(22) Filed: Nov. 18, 2004

(65) Prior Publication Data

US 2005/0264534 A1 Dec. 1, 2005

(30) Foreign Application Priority Data

May 31, 2004 (KR) ...................... 10-2004-0039366

(51) Int. Cl.
*G09G 5/08* (2006.01)

(52) U.S. Cl. .................. 345/166; 345/156; 345/163

(58) Field of Classification Search ............ 345/15–166
See application file for complete search history.

(56) References Cited

U.S. PATENT DOCUMENTS

| | | | |
|---|---|---|---|
| 6,166,723 | A | 12/2000 | Schena et al. |
| 6,611,921 | B2 | 8/2003 | Casebolt et al. |
| 6,795,056 | B2 * | 9/2004 | Norskog et al. ............. 345/158 |
| 2005/0078087 | A1 * | 4/2005 | Gates et al. ................. 345/163 |

FOREIGN PATENT DOCUMENTS

| | | |
|---|---|---|
| CN | 1357860 A | 7/2002 |
| TW | 126716 | 1/1990 |
| TW | 481307 | 3/2002 |
| TW | 574666 | 2/2004 |

OTHER PUBLICATIONS

Taiwan Office Action and English translation; date: Sep. 21, 2006; Application No. 2004100988633. All references cited in the action are listed above.
Notice of Allowance and Search Report; R.O.C. Patent Application No. 93135047; Nov. 16, 2004.

* cited by examiner

*Primary Examiner*—Jennifer Zubajlo
(74) *Attorney, Agent, or Firm*—Cantor Colburn LLP (57) ABSTRACT

Disclosure is a position tracking sensor of an optical mouse and method of controlling the same. The position tracking sensor comprises an image sensor for receiving light inputted from exterior of the optical mouse to detect an image and outputting image information on the detected image, and a controller for determining whether the optical mouse is spaced apart from a worktable using the image information and turning off a light source when it is determined that the optical mouse is spaced apart from the worktable. Thus, it is possible not only to prevent malfunction of the optical mouse resulting from the image detected by external light when the optical mouse is spaced apart from the worktable, but also to prevent the light source from being unnecessarily turned on and the resulting undesired consumption of electrical power.

17 Claims, 6 Drawing Sheets

POSITION TRACKING SENSOR OF OPTICAL MOUSE AND METHOD OF CONTROLLING THE SAME

CROSS-REFERENCE TO RELATED APPLICATION

This application claims the benefit of Korean Patent Application No. 2004-39366, filed on May 31, 2004, the disclosure of which is hereby incorporated herein by reference in its entirety.

BACKGROUND OF THE INVENTION

1. Field of the Invention

The present invention relates to an optical mouse and, more particularly, to a position tracking sensor of an optical mouse and method of controlling the same capable of preventing malfunction of the optical mouse and undesired consumption of electrical power which may be generated when the optical mouse is spaced apart from a worktable.

2. Description of the Related Art

An operation state of a position tracking sensor of an optical mouse may be usually divided into an active state and an inactive state according to an operation state of the optical mouse. In the active state, the position tracking sensor continuously detects an image of a worktable such as a mouse pad using light generated by a light source while the light source is maintained in an On state, and then calculates and outputs a value of movement from a change of the detected image. Further, when no change of the detected image is found for a predetermined time, the position tracking sensor is converted from the active state into the inactive state. In the inactive state, the position tracking sensor maintains the light source in an Off state during most of time and periodically turns on the light source to detect the image of the worktable. In this case, the position tracking sensor maintains the inactive state when no change of the detected image is found, but it is converted from the inactive state into the active state when any change of the detected image is found. In this manner, the light source is turned off during most of time while the optical mouse does not move, so that it is possible to reduce consumption of electrical power.

However, in the case of operating as set forth above, there is a possibility of malfunction when the optical mouse is spaced apart from the worktable. In other words, when the optical mouse is spaced apart from the worktable in the inactive state, an image irrelevant to movement of the optical mouse is detected by external light at the position tracking sensor. For this reason, the position tracking sensor may abnormally be converted from the inactive state into the active state. Further, because the image is irrelevant to movement of the optical mouse, the active state may continue to be maintained although the active state must be converted into the inactive state in reality. In both cases, the light source is turned on, so that undesired consumption of electrical power is also generated. Further, in the active state of the both cases, a wrong movement value may be calculated by the image irrelevant to movement of the optical mouse as set forth above.

SUMMARY OF THE INVENTION

It is, therefore, an objective of the present invention to provide a position tracking sensor of an optical mouse capable of preventing malfunction of the optical mouse and undesired consumption of electrical power which may be generated when the optical mouse is spaced apart from a worktable such as a mouse pad.

It is another objective of the present invention to provide a method of controlling a position tracking sensor of an optical mouse capable of accomplishing the foregoing objective.

In order to accomplish the first objective, there is provided a position tracking sensor of an optical mouse. The position tracking sensor comprises an image sensor for receiving light inputted from exterior of the optical mouse to detect an image and for outputting image information on the detected image, and a controller determines whether the optical mouse is spaced apart from a worktable using the image information, and turns off a light source when it is determined that the optical mouse is spaced apart from the worktable.

Here, the controller includes an active state where the light source is maintained in an On state during most of time and a value of movement is calculated using the image information, an inactive state where the light source is maintained in an Off state during most of time and the light source is intermittently turned on to determine whether the optical mouse moves or not, and a function of converting the active state into the inactive state when it is determined that the optical mouse is spaced apart from the worktable using the image information in the active state.

Preferably, the controller includes a function of intermittently performing operation for a first sensing mode which determines whether the optical mouse is spaced apart from the worktable by turning off the light source in the active state and then measuring light intensity of the image information.

Further, the controller allows a user to set a point of time to perform the first sensing mode operation.

Furthermore, the controller allows a user to set a point of time to be converted from the active state into the inactive state.

Preferably, the controller further includes a function of intermittently performing operation for a second sensing mode determining whether the optical mouse is spaced apart from the worktable by turning off the light source in the inactive state and then measuring light intensity of the image information.

Also, the controller allows a user to set a point of time to perform the second sensing mode operation.

Preferably, the controller further includes a function of maintaining the light source in the Off state until the second sensing mode operation is performed again when it is determined that the optical mouse is spaced apart from the worktable by the second sensing mode operation in the inactive state.

Meanwhile, the controller further includes a function of intermittently performing operation for a third sensing mode determining whether the optical mouse is spaced apart from the worktable by turning on the light source in the inactive state and then measuring light intensity of the image information.

Further, the controller allows a user to set a point of time to perform the third sensing mode operation.

Preferably, the controller further has a function of maintaining the light source in the Off state for a predetermined time when it is determined that the optical mouse is spaced apart from the worktable by the third sensing mode operation.

Also, the predetermined time can be set by a user.

The position tracking sensor is characterized in that the controller further includes two functions, one of which maintains the light source in the Off state for a first predetermined time when it is determined that the optical mouse is spaced apart from the worktable using the image information after the light source is turned off in the inactive state, and the other maintains the light source in the Off state for a second predetermined time when it is determined that the optical mouse is spaced apart from the worktable using the image information after the light source is turned on in the inactive state.

Also, the controller has an active state and an inactive state. In the active state, the light source is maintained in an On state during most of time and a value of movement is calculated using the image information. In the inactive state, the light source is maintained in an Off state during most of time and the light source is intermittently turned on to determine whether the optical mouse moves or not. The controller converts the active state into the inactive state when it is determined that the optical mouse is spaced apart from the worktable using the image information in the active state, and maintains the light source in the Off state for a predetermined time when it is determined that the optical mouse is spaced apart from the worktable using the image information in the inactive state.

In order to accomplish the second objective, there is provided a method of controlling a position tracking sensor of an optical mouse. The method comprises the steps of a) turning on a light source to detect an image of a worktable and calculating a value of movement from the detected image, and b) turning off the light source when it is determined that the optical mouse is spaced apart from the worktable using the detected image.

Here, the step b) includes a first sensing step of turning off the light source and measuring light intensity of the detected image to determine whether the optical mouse is spaced apart from the worktable in an active state where the light source is maintained in an On state during most of time and the value of movement is calculated, and a converting step of converting the active state into an inactive state, where the light source is maintained in an Off state during most of time and the light source is intermittently turned on to determine whether the optical mouse moves or not, when it is determined that the optical mouse is spaced apart from the worktable in the first sensing step.

Preferably, the step b) further includes a second sensing step of turning off the light source in the inactive state and measuring the light intensity of the detected image to determine whether the optical mouse is spaced apart from the worktable, and a sleeping step of maintaining the light source in the Off state for a predetermined time when it is determined that the optical mouse is spaced apart from the worktable in the second sensing step.

Further, the step b) further includes a third sensing step of turning on the light source in the inactive state and measuring the light intensity of the detected image to determine whether the optical mouse is spaced apart from the worktable, and a long-time sleeping step of maintaining the light source in the Off state for a predetermined time when it is determined that the optical mouse is spaced apart from the worktable in the third sensing step.

Meanwhile, the step b) further includes a second sensing step of turning off the light source in the inactive state and measuring the light intensity of the detected image to determine whether the optical mouse is spaced apart from the worktable, a sleeping step of maintaining the light source in the Off state for a first predetermined time when it is determined that the optical mouse is spaced apart from the worktable in the second sensing step, a third sensing step of turning on the light source in the inactive state and measuring the light intensity of the detected image to determine whether the optical mouse is spaced apart from the worktable, and a long-time sleeping step of maintaining the light source in the Off state for a second predetermined time when it is determined that the optical mouse is spaced apart from the worktable in the third sensing step.

Also, the step b) further includes an action sensing step of measuring light intensity of the detected image to determine whether the optical mouse is spaced apart from the worktable in an active state where the light source is maintained in an On state during most of time and the value of movement is calculated, a converting step of converting the active state into an inactive state, where the light source is maintained in an Off state during most of time and the light source is intermittently turned on to determine whether the optical mouse moves or not, when it is determined that the optical mouse is spaced apart from the worktable in the action sensing step, an inaction sensing step of measuring the light intensity of the detected image to determine whether the optical mouse is spaced apart from the worktable in the inactive state, and a sleeping step of maintaining the light source in the Off state for a predetermined time when it is determined that the optical mouse is spaced apart from the worktable in the inaction sensing step.

BRIEF DESCRIPTION OF THE DRAWINGS

The above and other features and advantages of the present invention will become more apparent to those of ordinary skill in the art by describing in detail preferred embodiments thereof with reference to the attached drawings in which.

DETAILED DESCRIPTION OF THE INVENTION

The present invention will now be described more fully hereinafter with reference to the accompanying drawings, in which preferred embodiments of the invention are shown.

Figure 1:
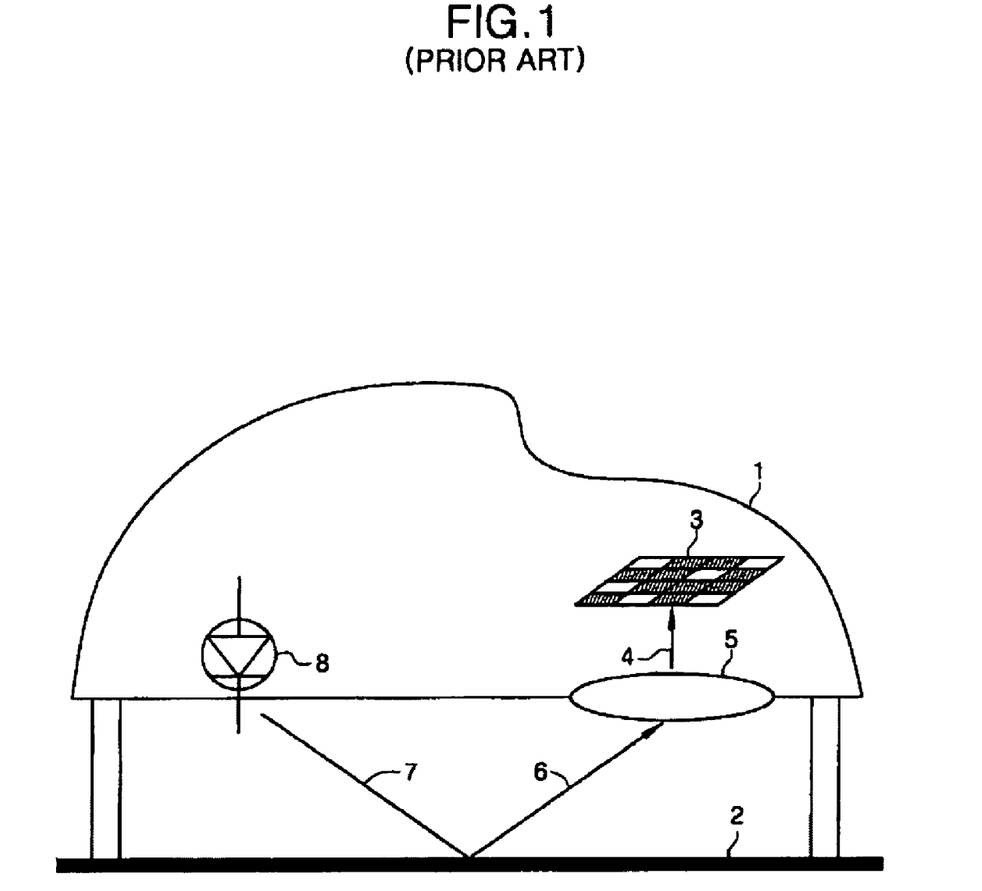
FIG. 1 shows a general optical mouse.

FIG. 1 shows a general optical mouse, which is composed of a light source 8, a lens 5 and a sensor 3.

Among reference numerals in FIG. 1, 2 indicates a worktable surface, 4, 6 and 7 indicate lights.

As to the optical mouse shown in FIG. 1, the light 7 emitted from the light source 8 is reflected from the worktable surface 2, and then the reflected light 6 passes through the lens 5. The light passing through the lens 5 is inputted into the sensor 3. The sensor 3 detects an image of the worktable surface 2 one after another, and thus senses movement of the optical mouse from a change of the image, calculates a valve of movement and controls On/Off of the light source 8.

Figure 2:
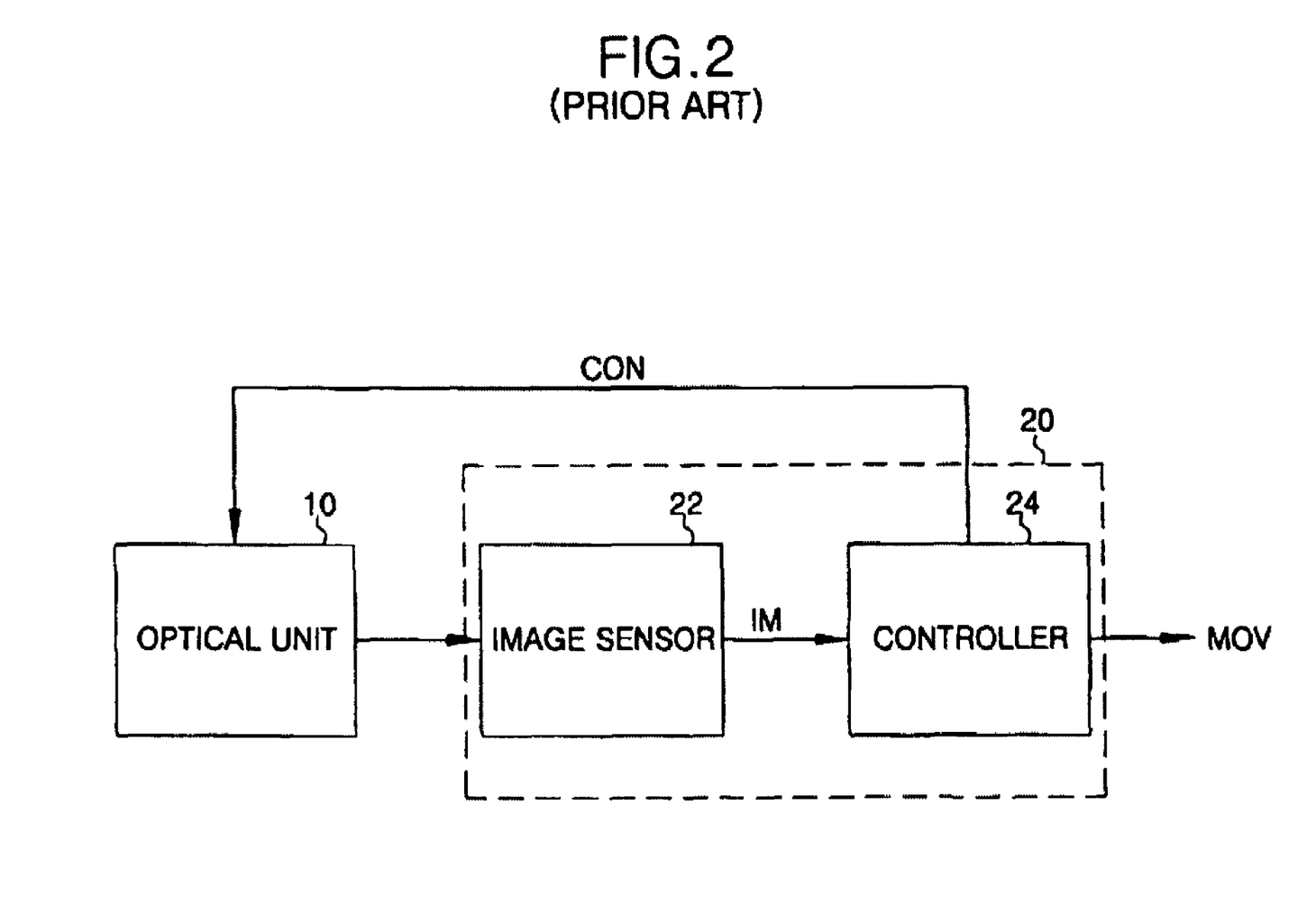
FIG. 2 is a block diagram showing a general optical mouse.

FIG. 2 shows a block diagram of a general optical mouse, in which the optical mouse is composed of an optical unit 10 and a position tracking sensor 20. The position tracking sensor 20 includes an image sensor 22 and a controller 24.

The following description will be made about functions of each block shown in FIG. 2.

The optical unit 10 is composed of a light source, a lens and other attachments. The optical unit 10 applies light to an object using the light source, and transmits the light reflected from the object to the image sensor 22 within the position tracking sensor 20 by means of the lens. The position tracking sensor 20 calculates and outputs a movement value MOV using an optical image transmitted through the optical unit 10, and outputs a control signal CON for controlling the light source of the optical unit 10. The image sensor 22 receives the light reflected through the lens to detect the image, and then outputs image information IM on the detected image. The controller 24 calculates the movement value MOV using the image information IM, and outputs the control signal CON controlling On/Off of the light source based on an operation state of the optical mouse.

Figure 3:
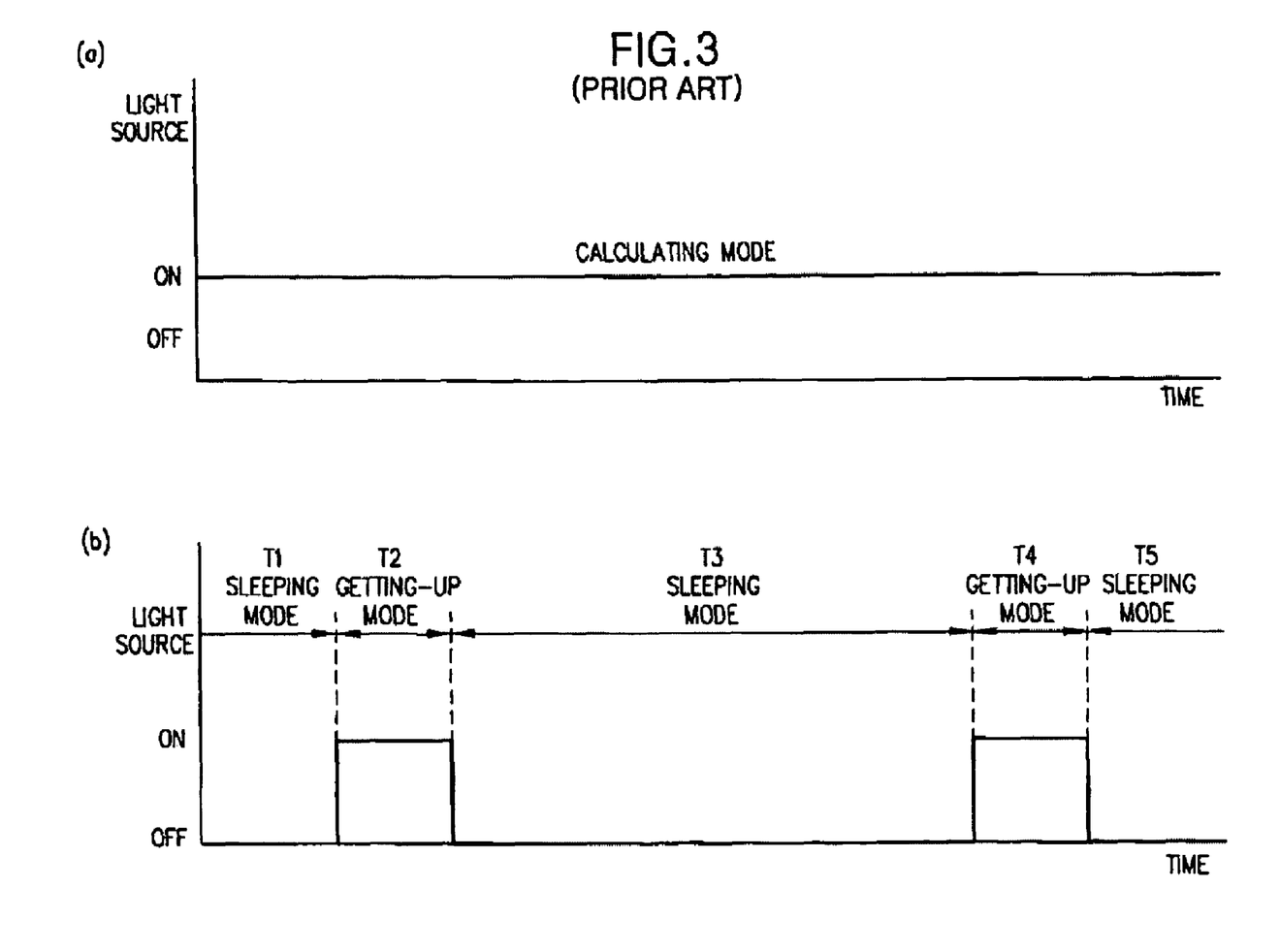
FIG. 3 is a view for explaining an operation mode according to an operation state of a controller of a position tracking sensor of an optical mouse.

FIG. 3 is a view for explaining an operation mode according to an operation state of the controller 24 of the position tracking sensor 20 of the conventional optical mouse shown in FIG. 2, wherein FIG. 3A shows an operation mode in an active state, and FIG. 3B shows an operation mode in an inactive state. In FIG. 3, a solid line represents On/Off of the light source.

The operation mode of the conventional position tracking sensor 20 shown in FIG. 2 will be described with reference to FIG. 3 as follows.

As set forth above, the controller 24 is divided into two states of active state A and inactive state B according to whether the optical mouse moves or not. In the active state A, operation for an calculation mode is performed. In the calculation mode, the controller 24 maintains the light source in an On state, and calculates the movement value from a change of the image detected by the image sensor 22. When the optical mouse does not move for a certain time, the controller 24 is converted from the active state A into the inactive state B.

In the inactive state B, operation for a sleeping mode is basically performed (time periods T1, T3 and T5), and operation for a getting-up mode is periodically performed (time periods T2 and T4). In the sleeping mode, the controller 24 turns off the light source and does not perform operation for calculating the movement value (time periods T1, T3 and T5). In the getting-up mode, the controller 24 turns on the light source and determines whether the optical mouse moves or not (time periods T2 and T4). As a result of the determination by performing the getting-up mode, if the optical mouse moves, the controller 24 is converted into the active state A.

Figure 4:
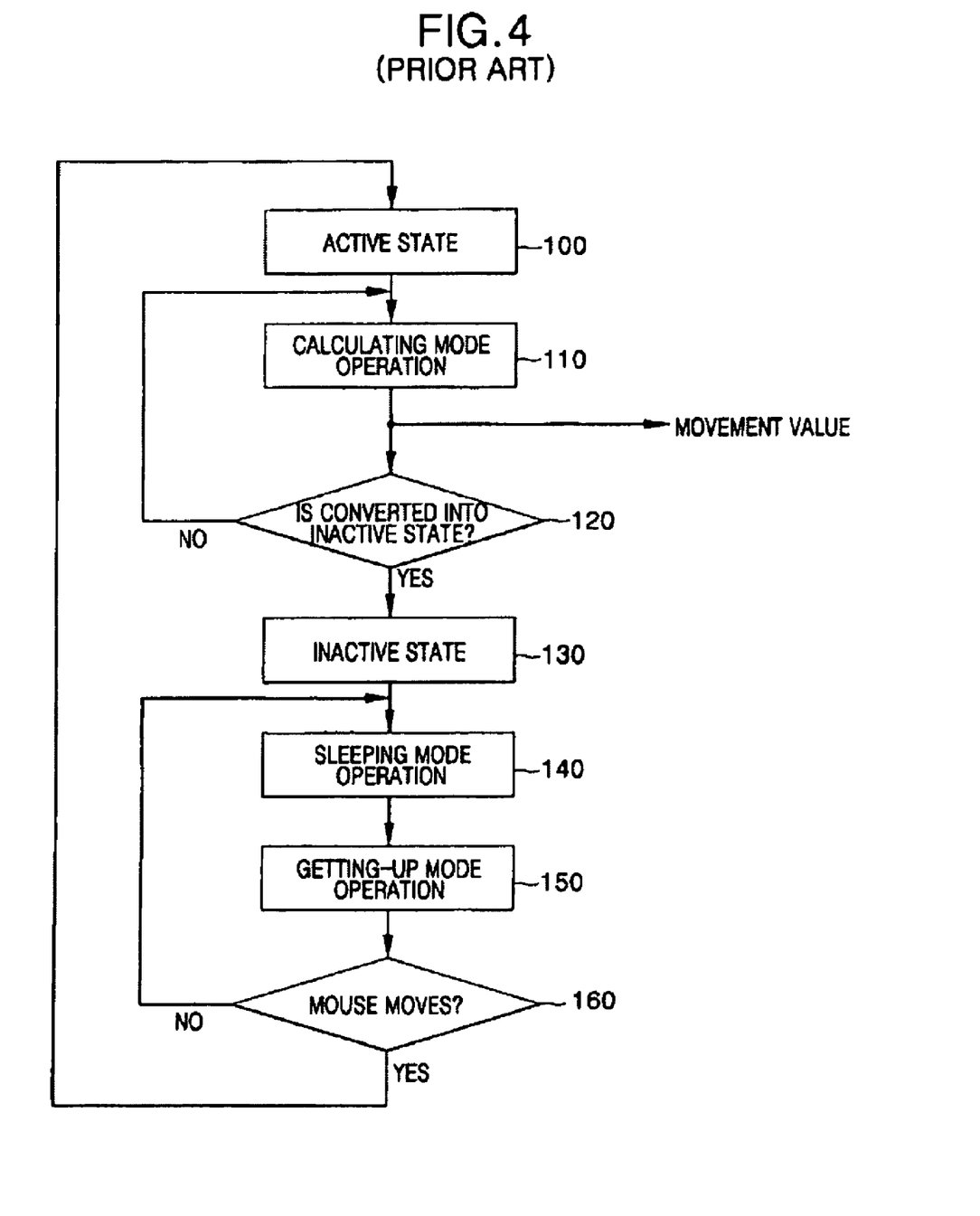
FIG. 4 is a flow chart explaining operation of a controller of a position tracking sensor a conventional optical mouse.

FIG. 4 is a flow chart explaining operation of the controller 24 of the conventional optical mouse. The following description will be made about operation of the controller 24 of the conventional optical mouse with reference to FIG. 4.

First, the controller 24 of the optical mouse starts operation in the active state (Step 100). Therefore, the controller 24 of the optical mouse performs the calculation mode operation (Step 110). That is, the controller 24 calculates the movement value using the image detected by the image sensor 22 to outputs the movement value while maintaining the light source in the On state. Next, it is determined whether to convert from the active state into the inactive state (Step 120). Specifically, when the optical mouse does not move for a certain time with reference to the movement value, the controller 24 is converted into the inactive state (Step 130). Otherwise, the controller 24 operates in the calculation mode while continuing to maintain the active state (Step 100).

When being converted into the inactive state, the controller 24 of the optical mouse performs the sleeping mode operation first (Step 140), that is, turns off the light source and does not calculate the movement value. Next, when a certain time has lapsed, the getting-up mode operation is performed (Step 150). Specifically, the light source is turned on, and it is determined whether the optical mouse moves or not using the image detected by the image sensor 22 (Step 160). As a result of the determination in Step 160, if the optical mouse does not move, the sleeping mode operation is performed again (Step 140). However, if the optical mouse moves, the controller 24 is converted into the active state (Step 100). Specifically, in the inactive state, the sleeping mode operation is basically performed and the getting-up mode operation is periodically performed. Thereby, it is determined whether the optical mouse moves or not, and as a result of the determination, only when the optical mouse moves, the controller is converted into the active state.

However, as set forth above, when the optical mouse is spaced apart from the worktable such as a mouse pad, the image sensor 22 within the position tracking sensor 20 detects a wrong image caused by external light rather than the image of the worktable caused by the light source. In this case, the controller 24 must be converted into the inactive state because the optical mouse does not actually move. Nevertheless, it is determined that the optical mouse has moved in Step 120, so that the controller 24 is not converted into the inactive state. Further, because the optical mouse does not actually move, the controller 24 must maintain the inactive state. However, it is determined that the optical mouse has moved in Step 160, so that the controller 24 is converted into the active state. All two cases turn on the light source, and thus undesired electrical power is spent. In addition, a wrong movement value may be calculated.

Thus, the controller 24 within the position tracking sensor 20 of the present invention is characterized by performing operation for a sensing mode where it is determined whether the optical mouse is spaced apart from the worktable. In the sensing mode, the controller 24 turns off the light source and determines light intensity of the image detected by the image sensor 22, thereby determining whether the optical mouse is spaced apart from the worktable. In other words, in the process of performing the sensing mode operation, when the optical mouse is brought into close contact with the work table, the light intensity of the sensed image is very weak because the light source is turned off. However, when the optical mouse is spaced apart from the worktable, the light intensity of the detected image becomes stronger than when the optical mouse is brought into close contact with the worktable, because the external light is detected although the light source is turned off. As a result, by turning off the light source and measuring the light intensity of the detected image, it can be determined whether the optical mouse is spaced apart from the worktable or not.

Figure 5:
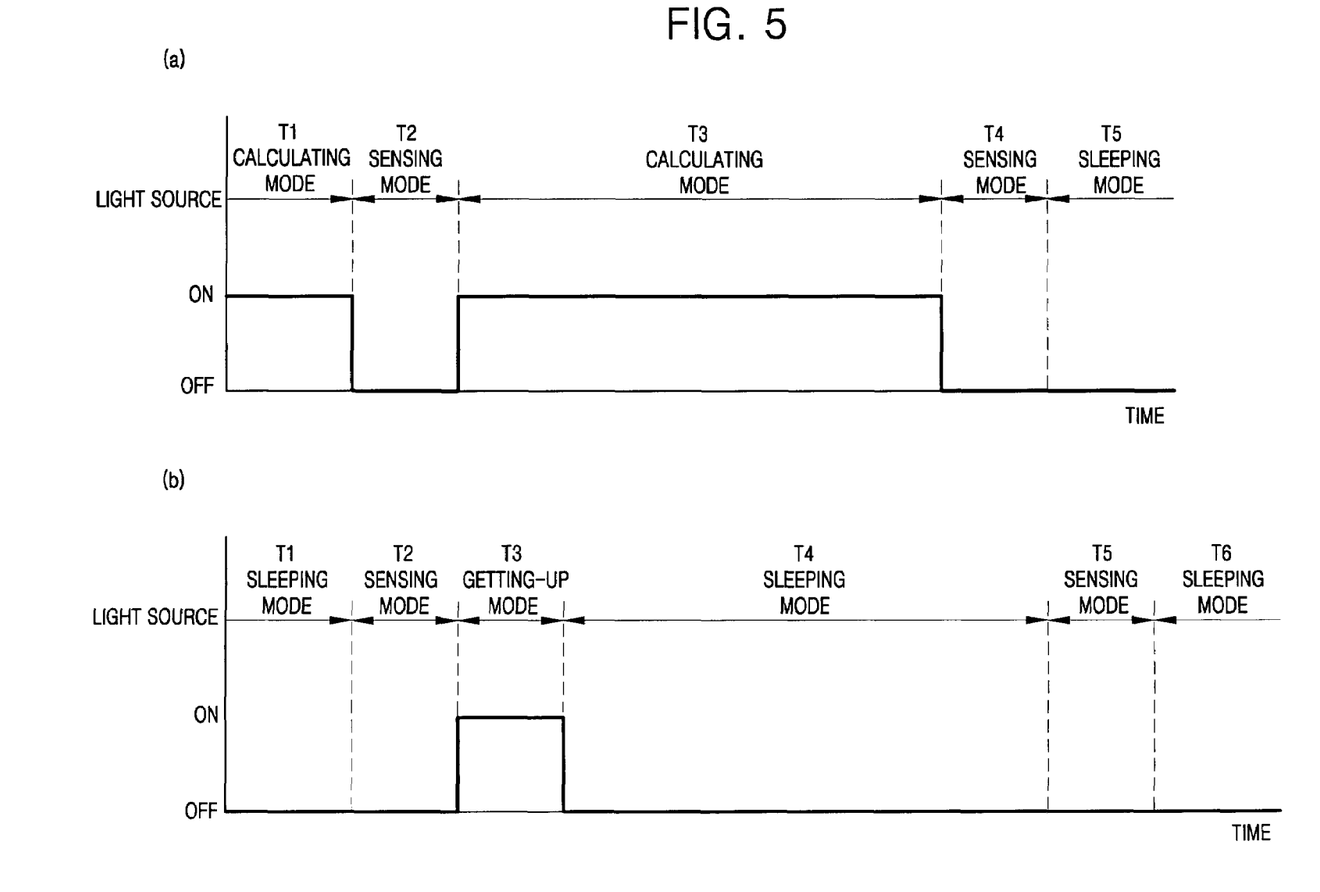
FIG. 5 is a view for explaining an operation mode according to an operation state of a controller of a position tracking sensor of an optical mouse according to the present invention.

FIG. 5 is a view for explaining an operation mode according to an operation state of the controller 24 of the position tracking sensor 20 of the optical mouse according to the present invention, wherein FIG. 5A shows an operation mode in an active state, and FIG. 5B shows an operation mode in an inactive state. In FIG. 5, a solid line represents On/Off of the light source.

The operation mode of the controller 24 of the optical mouse according to the present invention will be described with reference to FIG. 5 as follows.

In the active state A, the controller 24 of the present invention basically performs the calculation mode operation (time periods T1 and T3), and periodically performs the sensing mode operation (time periods T2 and T4). In the sensing mode, the controller 24 turns off the light source and measures the light intensity of the detected image, thereby determining whether the optical mouse is spaced apart from the worktable. As a result of the determination, when the optical mouse is not spaced apart from the worktable, i.e., is brought into close contact with the worktable, the controller 24 performs the calculation mode operation while maintaining the active state (time periods T2 and T3). The calculation mode operation is the same as described in FIG. 2. However, when the optical mouse is spaced apart from the worktable, the controller 24 is converted into the inactive state to perform the sleeping mode operation (time periods T4 and T5).

In the inactive state B, the position tracking sensor 20 of the present invention basically performs the sleeping mode operation (time periods T1 and T4), and periodically performs the sensing mode operation and the getting-up mode operation (time periods T2, T3 and T5). The sleeping mode operation and the getting-up mode operation are the same as described in FIG. 2, and the sensing mode operation is the same as described in FIG. 4A. As a result of the determination during operation in the sensing mode, when the optical mouse is brought into close contact with the worktable, the controller 24 operates in the getting-up mode (time periods T2 and T3). As a result the determination in the getting-up mode, when the optical mouse does not move, the controller 24 operates in the sleeping mode (time periods T3 and T4). As a result the determination in the sensing mode, when the optical mouse is spaced apart from the worktable, the controller operates in the sleeping mode directly without operating in the getting-up mode (time periods T5 and T6).

Thus, the position tracking sensor 20 of the present invention is converted into the inactive state when the optical mouse is spaced apart from the worktable in the active state, and does not operate in the getting-up mode when the optical mouse is spaced apart from the worktable in the inactive state. Thereby, it is possible to reduce undesired consumption of electrical power.

However, when the surroundings are dark, the sensing mode operation may be preformed to determine whether the optical mouse is spaced apart from the worktable. In this case, if mouse is spaced apart from the worktable, the light intensity of the image detected by the image sensor 22 is too weak, so that it is impossible to determine whether the optical mouse is spaced apart from the worktable in the sensing mode. Further, although the getting-up mode is performed when mouse is spaced apart from the worktable, the image sensor 22 detects the dark image based on the external light. Consequently, in the dark surroundings, although the getting-up mode is performed when mouse is spaced apart from the worktable, the movement of the optical mouse can not be tracked. For this reason, there is no possibility for the controller to be abnormally converted into the active state. However, because the getting-up mode operation is periodically performed, that is, the light source is turned on, undesired consumption of electrical power is incurred.

Therefore, in order to complement the foregoing drawback, the controller 24 within the position tracking sensor 20 of the present invention can be designed to determine whether the optical mouse is spaced apart from the worktable while performing the getting-up mode operation. In other words, when the getting-up mode operation is performed and when the optical mouse is brought into close contact with the worktable, the light intensity of the image detected by the image sensor 22 has a certain magnitude or more due to the light source. If the light intensity of the sensed image becomes weak, this may be considered to be the case that the optical mouse is spaced apart from the worktable in the dark surroundings. Thus, the position tracking sensor of the present invention determines whether the optical mouse is spaced apart from the worktable using the foregoing technique even when the getting-up mode operation is performed, and as a result of the determination, when the optical mouse is spaced apart from the worktable, the sleeping mode operation is performed for a long time. In the long-time sleeping mode operation, the controller 24 turns off the light source, and extends a period of time to perform the sensing mode operation and the getting-up mode operation. Therefore, it is possible to reduce a frequency of performing the getting-up mode operation and thus the undesired consumption of electrical power.

Figure 6:
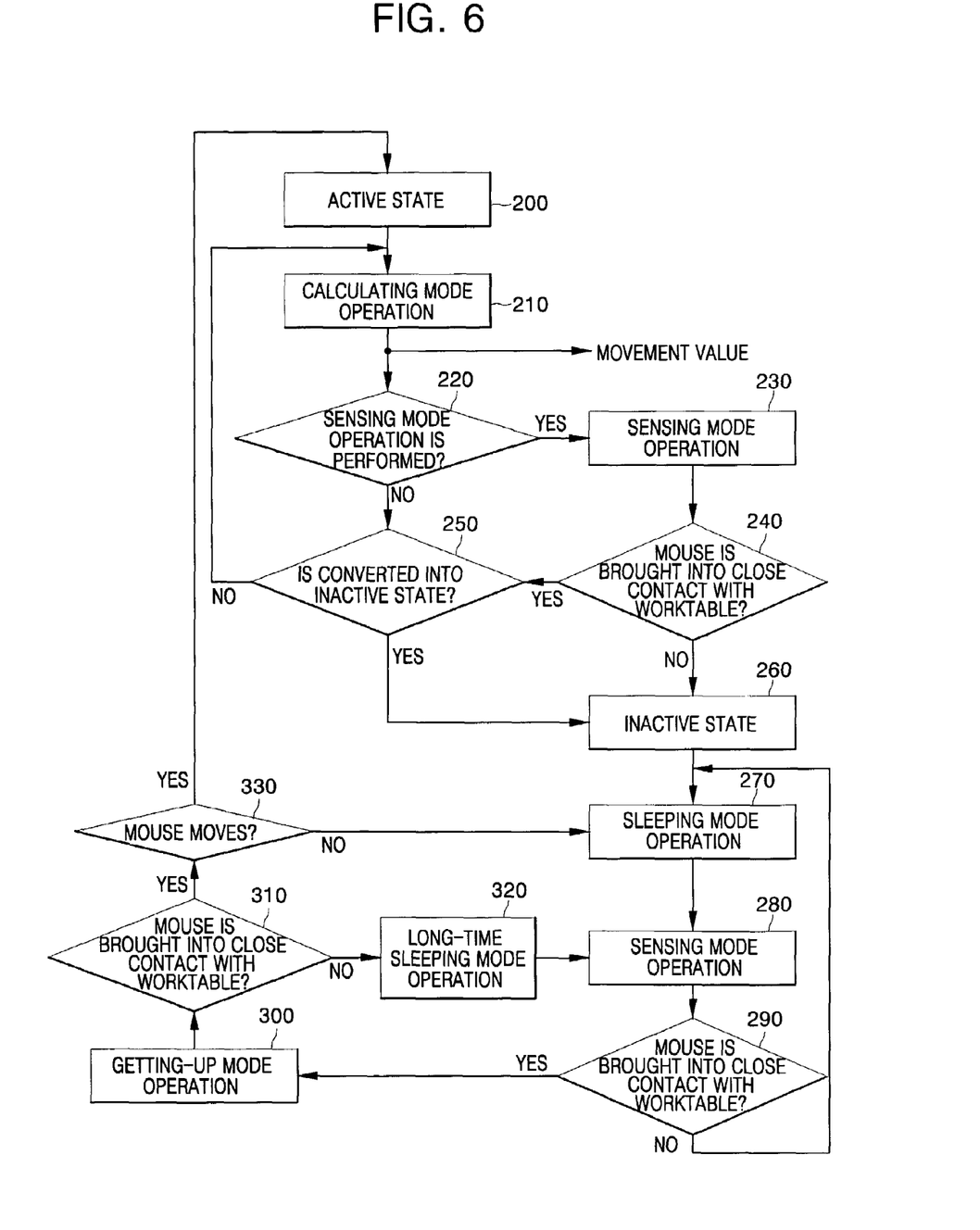
FIG. 6 is a flow chart explaining operation of a controller of a position tracking sensor of an optical mouse according to the present invention.

FIG. 6 is a flow chart explaining operation of the controller 24 of the position tracking sensor 20 of the present invention. The following description will be made about operation of the controller 24 of the position tracking sensor 20 of the present invention with reference to FIG. 6.

First, the controller 24 of the present invention starts operation in the active state (Step 200). Therefore, the controller 24 performs the calculation mode operation (Step 210). That is, the controller 24 calculates the movement value using the image detected by the image sensor 22 to outputs the movement value while maintaining the light source in the On state. Next, it is determined whether to perform the sensing mode operation (Step 220). For instance, in the case that the position tracking sensor 20 is configured to periodically operate in the sensing mode in the active state, Step 220 is performed in order to determine whether a point of time to perform the sensing mode operation is reached using an internal counter and so on. Although not shown, either a period of time to perform the sensing mode operation or a point of time to perform the sensing mode operation may be set by a user.

As a result of the determination in Step 220, if the sensing mode operation should be performed, the controller 24 performs the sensing mode operation (Step 230). In other words, by turning off the light source and measuring the light intensity of the detected image, it is determined whether the optical mouse is brought into close contact with the worktable (Step 240).

However, if the sensing mode operation should not be performed as a result of the determination in Step 220, or if the optical mouse is brought into close contact with the worktable as a result of the determination in Step 240, the controller 24 determines whether to be converted into the inactive state (Step 250). Specifically, if the optical mouse does not move for a certain time with reference to the movement value, the controller is converted into the inactive state. If not, the controller performs the calculation mode operation while continuing to maintain the active state.

If the optical mouse is not brought into close contact with the worktable, namely, is spaced apart from the worktable as a result of the determination in Step 240, or if the optical mouse does not move for a certain time as a result of the determination in Step 250, the position tracking sensor 20 is converted into the inactive state (Step 260).

In that case, the controller 24 of the optical mouse performs the sleeping mode operation first (Step 270). In other words, the light source is turned off, and the movement value is not calculated. Next, when a point of time to perform the sensing mode operation is reached, the sensing mode operation is performed (Step 280). In other words, the light intensity of the detected image is measured while the light source is turned off, so that it is determined whether the optical mouse is brought into close contact with the worktable (Step 290). The time point to perform the sensing mode operation may be set by the user, and may be set to be repeated with a certain period of time.

As a result of the determination in Step 290, if the optical mouse is spaced apart from the worktable, the sleeping mode operation is performed again (Step 270). As a result of the determination in Step 290, if the optical mouse is brought into close contact with the worktable, the getting-up mode operation is performed after a certain time has lapsed (Step 300). The certain time may be set by the user. When the getting-up mode operation is performed, the controller 24 determines whether the optical mouse is brought into close contact with the worktable first (Step 310). In other words, by turning on the light source and measuring the light intensity of the detected image, it is determined whether the optical mouse is brought into close contact with the worktable.

As a result of the determination in Step 310, if the optical mouse is spaced apart from the worktable, the position tracking sensor 20 performs the long-time sleeping mode operation (Step 320). In other words, after the period of time to perform the sensing mode operation and the getting-up mode operation is compelled, the sensing mode operation and the getting-up mode operation are performed.

As a result of the determination in Step 310, if the optical mouse is brought into close contact with the worktable, the position tracking sensor 20 determines whether the optical mouse moves or not (Step 330). In other words, the light intensity of the detected image is measured while the light source is turned on to determine whether the optical mouse moves or not. As a result of the determination in Step 330, if the optical mouse does not move, the sleeping mode operation is performed again (Step 270). However, as a result of the determination in Step 330, if the optical mouse moves, the controller is converted into the active state (Step 200).

Thus, the position tracking sensor 20 of the present invention is converted into the inactive state when the optical mouse is spaced apart from the worktable in the active state, but not converted into the active state when the optical mouse is spaced apart from the worktable in the inactive state. In this manner, the position tracking sensor 20 is prevented from performing the getting-up mode operation when the optical mouse is spaced apart from the worktable in the inactive state, so that it is possible to reduce the undesired consumption of electrical power. Further, when the optical mouse is spaced apart from the worktable in the active state, it is possible to prevent malfunction that the wrong image is detected based on the external light and thus the wrong movement value is calculated.

Consequently, in the case of the position tracking sensor of the optical mouse and method of controlling the same according to the present invention, when the optical mouse is spaced apart from the worktable, this is detected and the movement value is not calculated and simultaneously the light source is prevented from being turned on, so that it is possible to prevent the malfunction of the optical mouse and the undesired consumption of electrical power.

Although a preferred embodiment of the present invention has been described for illustrative purposes, it is apparent to those skilled in the art that various modifications, additions and substitutions are possible, without departing from the scope and spirit of the invention as disclosed in the accompanying claims.

What is claimed is:

1. A position tracking sensor of an optical pointing device, comprising:
   an image sensor for receiving light inputted from exterior of the optical pointing device to detect an image and outputting image information on the detected image;
   a controller for determining whether the optical pointing device is spaced apart from a worktable using the image information and turning off a light source of the optical pointing device when it is determined that the optical pointing device is spaced apart from the worktable,
   wherein the controller intermittently performs operation for a first sensing mode which determines whether the optical pointing device is spaced apart from the worktable by turning off the light source of the optical pointing device to measure light intensity of the image information in an active state where the light source of the optical pointing device is maintained in an On state for most of a time and a value of movement is calculated using the image information.

2. The position tracking sensor as set forth in claim 1, wherein the controller has the active state and an inactive state where the light source of the optical pointing device is maintained in an Off state during most of time and the light source of the optical pointing device is intermittently turned on to determine whether the optical pointing device moves or not, and converts the active state into the inactive state when it is determined that the optical pointing device is spaced apart from the worktable using the image information in the active state.

3. The position tracking sensor as set forth in claim 2, wherein the controller allows a user to set a point of time to perform the first sensing mode operation.

4. The position tracking sensor as set forth in claim 2, wherein the controller allows a user to set a point of time to be converted into the inactive state.

5. The position tracking sensor as set forth in claim 2, wherein the controller further intermittently performs operation for a second sensing mode determining whether the optical pointing device is spaced apart from the worktable by turning off the light source of the optical pointing device to measure light intensity of the image information in the inactive state.

6. The position tracking sensor as set forth in claim 5, wherein the controller allows a user to set a point of time to perform the second sensing mode operation.

7. The position tracking sensor as set forth in claim 5, wherein the controller further maintains the light source of the optical pointing device in the Off state until the second sensing mode operation is performed again when it is determined that the optical pointing device is spaced apart from the worktable by the second sensing mode operation in the inactive state.

8. The position tracking sensor as set forth in claim 2, wherein the controller further intermittently performs operation for a third sensing mode determining whether the optical pointing device is spaced apart from the worktable by turning on the light source of the optical pointing device to measure light intensity of the image information in the inactive state.

9. The position tracking sensor as set forth in claim 8, wherein the controller allows a user to set a point of time to perform the third sensing mode operation.

10. The position tracking sensor as set forth in claim 8, wherein the controller further maintains the light source of the optical pointing device in the Off state for a predetermined time when it is determined that the optical pointing device is spaced apart from the worktable by the third sensing mode operation.

11. The position tracking sensor as set forth in claim 10, wherein the predetermined time can be set by a user.

12. The position tracking sensor as set forth in claim 2, wherein the controller:
   maintains the light source of the optical pointing device in the Off state for a first predetermined time when it is determined that the optical pointing device is spaced apart from the worktable by turning off the light source of the optical pointing device to measure light intensity in the inactive state; and maintains the light source of the optical pointing device in the Off state for a second predetermined time that is longer than the first predetermined time when it is determined that the optical pointing device is spaced apart from the worktable by turning on the light source of the optical pointing device to measure light intensity of the image information in the inactive state.

13. The position tracking sensor as set forth in claim 1, wherein the controller has the active state and an inactive state, the inactive state maintaining the light source in an Off state and intermittently turning on the light source to determine whether the optical mouse moves or not and converts the active state into the inactive state when it is determined that the optical pointing device is spaced apart from the worktable using the image information in the active state, and maintains the light source of the optical pointing device in the Off state for a predetermined time when it is determined that the optical pointing device is spaced apart from the worktable using the image information in the inactive state.

14. A method of controlling a position tracking sensor of an optical pointing device, the method comprising the steps of:
   a) turning on a light source of the optical pointing device to light up a worktable;
   b) detecting an image of the worktable;
   c) calculating a movement value from the detected image; and
   d) turning off the light source of the optical pointing device when it is determined that the optical pointing device is spaced apart from the worktable using the detected image wherein the step d) includes:
   a first sensing step of determining whether the optical pointing device is spaced apart from the worktable by turning off the light source of the optical pointing device to measure light intensity of the detected image in an active state where the light source of the optical pointing device is maintained in an On state during most of time and the movement value is calculated; and
   a converting step of converting the active state into an inactive state, where the light source of the optical pointing device is maintained in an Off state during most of time and the light source of the optical pointing device is intermittently turned on to determine whether the optical pointing device moves or not, when it is determined that the optical pointing device is spaced apart from the worktable in the first sensing step.

15. The method as set forth in claim 14, wherein the step d) further includes:
   a second sensing step of determining whether the optical pointing device is spaced apart from the workable by turning off the light source of the optical pointing device to measure the light intensity of the detected image in the inactive state; and
   a sleeping step of maintaining the light source of the optical pointing device in the Off state for a predetermined time when it is determined that the optical pointing device is spaced apart from the worktable in the second sensing step.

16. The method as set forth in claim 14, wherein the step d) further includes:
   a third sensing step of determining whether the optical pointing device is spaced apart from the workable by turning on the light source of the optical pointing device to measure the light intensity of the detected image in the inactive state; and
   a long-time sleeping step of maintaining the light source of the optical pointing device in the Off state for a predetermined time when it is determined that the optical pointing device is spaced apart from the worktable in the third sensing step.

17. The method as set forth in claim 14, wherein the step d) further includes:
   a second sensing step of determining whether the optical pointing device is spaced apart from the worktable by turning off the light source of the optical pointing device to measure the light intensity of the detected image in the inactive state;
   a sleeping step of maintaining the light source of the optical pointing device in the Off state for a first predetermined time when it is determined that the optical pointing device is spaced apart from the worktable in the second sensing step;
   a third sensing step of determining whether the optical pointing device is spaced apart from the worktable by turning on the light source of the optical pointing device to measure the light intensity of the detected image in the inactive state; and
   a long-time sleeping step of maintaining the light source of the optical pointing device in the Off state for a second predetermined time that is longer than the first predetermined time when it is determined that the optical pointing device is spaced apart from the worktable in the third sensing step.

* * * * *